United States Patent [19]

Takebayashi et al.

[11] Patent Number: 5,027,420
[45] Date of Patent: Jun. 25, 1991

[54] METHOD AND APPARATUS FOR GENERATING PATTERNS WITH A USER PREFERENCE LEARNING FUNCTION

[75] Inventors: Yoichi Takebayashi, Yokohama; Isamu Iwai; Miwako Doi, both of Kawasaki; Mika Fukui, Yokohama, all of Japan

[73] Assignee: Kabushiki Kaisha Toshiba, Kawasaki, Japan

[21] Appl. No.: 285,020

[22] Filed: Dec. 16, 1988

[30] Foreign Application Priority Data

Dec. 25, 1987 [JP] Japan ................ 62-327510

[51] Int. Cl.$^5$ ................................ G06K 9/68
[52] U.S. Cl. ................................ 382/38; 382/41; 382/54; 382/10
[58] Field of Search ............ 382/38, 10, 41, 45, 382/54, 46, 44, 47; 340/724, 731; 364/200; 358/22, 448

[56] References Cited

U.S. PATENT DOCUMENTS

| | | | |
|---|---|---|---|
| 4,665,555 | 5/1987 | Alker et al. | 382/41 |
| 4,783,832 | 11/1988 | Kaneko | 382/41 |
| 4,790,025 | 12/1988 | Inoue et al. | 382/41 |
| 4,885,704 | 12/1989 | Takagi et al. | 382/41 |

OTHER PUBLICATIONS

K. Sakai, et al., *An Optical Chinese Character Reader*, pp. 122–126.
Isamu Iwai, et al., *Extraction of Document Architecture in a Document Processing System* pp. 1309–1310.

Primary Examiner—Michael Razavi
Attorney, Agent, or Firm—Foley & Lardner

[57] ABSTRACT

A method and an apparatus for generating patterns of images, sounds, documents, or graphics by processing data indicating the patterns to be generated, which can produce patterns in accordance with the personal preference and inclination of a user and which can be operated in a simple manner. The method includes the steps of processing input data, extracting feature data indicating physical features of the pattern, allowing a user to enter subjective evaluation values indicating the user's evaluation for characterizing quantities defined in terms of the physical features, deriving objective evaluation values indicating the apparatus' evaluation for the characterizing quantities with respect to prescribed reference values, determining pattern evaluation values in accordance with the subjective evaluation values and the objective evaluation values, adjusting the manner of processing in accordance with the pattern evaluation values, and re-processing the input data in the adjusted manner. An apparatus to perform the method is also disclosed.

20 Claims, 9 Drawing Sheets

METHOD AND APPARATUS FOR GENERATING PATTERNS WITH A USER PREFERENCE LEARNING FUNCTION

BACKGROUND OF THE INVENTION

1. Field of the Invention

The present invention relates to a method and an apparatus for generating patterns of images, sounds, documents, or graphics by processing data indicating the patterns to be generated.

2. Description of the Background Art

Lately, a number of propositions have been made for a pattern generator utilizing a computer which generates a variety of patterns such as these of images, sounds, documents, or graphics by processing data, for the purpose of preparing presentation documents, public announcements, or brochures. Along with such pattern generators, there are various types of multi-functional editors for editing data obtained from any one of plurality of source media being developed.

Yet, such an editor becomes progressively complicated in order to accommodate diverse commands and functions as the number of types of data it deals with increases. As a result, mastering the skillful maneuvers for such an editor to be able to take full advantage of its superior faculties tends to require an enormous amount of training, and even with such skills it is often necessary to spend a great deal of effort and time in dealing with a complicated situation.

On the other hand, there are some propositions of document processing systems which edit a given document in a prescribed manner automatically by analyzing logical and referential structures of the document, such as one reported by I. Iwai, M. Doi, and M. Fukui in "On the Document Structure Generating Function of the Intelligent Document Editing System" appearing in 'The Proceedings of the 34th General Conference of the Japanese Society of Information Processing', pp. 1309-1310, 1987.

However, patterns generated by this type of editing system cannot possibly conform with all the diverse personal preferences and inclinations of different users.

Thus, up to the present, it has been necessary either to invest a great amount of effort and time to master the maneuvers of a multi-functional editor, or else to compromise with only partially satisfactory output patterns produced by an automatic editing system in order to spare effort and time.

SUMMARY OF THE INVENTION

It is therefore an object of the present invention to provide a method and an apparatus for generating patterns which can produce patterns in accordance with the personal preference and inclination of a user and which can be operated in a manner simple enough to require no formal training of the user.

According to one aspect of the present invention there is provided an apparatus for3 generating patterns, comprising: a data input unit for enabling introduction of input a data to the apparatus; data processing unit for processing the input data to generate a pattern data; pattern output unit for producing a pattern specified by the pattern a data; pattern feature extraction unit for extracting feature data indicating physical features of the pattern; a unit for allowing a user to enter subjective evaluation values indicating the user's estimate for characterizing quantities defined in terms of the physical features; a unit for deriving objective evaluation values indicating the apparatus' estimate for the characterizing quantities with respect to prescribed reference values; a pattern evaluation unit for determining pattern evaluation values in accordance with the subjective evaluation values and the objective evaluation values; unit for adjusting the manner of processing by the data processing unit in accordance with the pattern evaluation values; and a loop unit for making the data processing unit re-process the input data in the manner adjusted by the adjusting unit.

According to another aspect of the present invention there is provided a method of generating patterns, comprising the steps of: (a) introducing input data; (b) processing the input data to generate pattern data; (c) showing pattern specified by the pattern data; (d) extracting feature data indicating physical features of the pattern; (e) allowing a user to enter subjective evaluation values indicating the user's estimate for characterizing quantities defined in terms of the physical features; (f) deriving objective evaluation values indicating the apparatus' estimate for the characterizing quantities with respect to prescribed reference values; (g) determining pattern evaluation values in accordance with the subjective evaluation values and the objective evaluation values; (h) adjusting the manner of processing at step (b) in accordance with the pattern evaluation values; and (i) re-processing the input data in the manner adjusted at step (h).

Other features and advantages of the present invention will become apparent from the following description taken in conjunction with the accompanying drawings.

BRIEF DESCRIPTION OF THE DRAWINGS

FIGS. 2 (A) and (B) are diagrammatic illustrations for explaining an objective evaluation value and a subjective evaluation value used in the pattern generator shown in FIG. 1.

FIGS. 9 (A) and (B) are illustrations of examples of output patterns displayed by a CRT display of the pattern generator shown in FIG. 3.

DETAILED DESCRIPTION OF THE PREFERRED EMBODIMENTS

Figure 1:
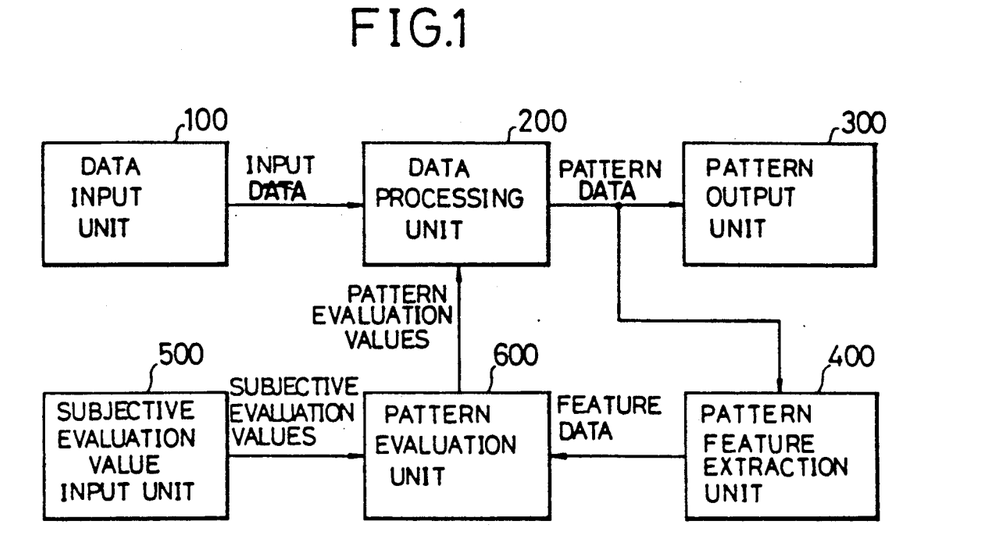
FIG. 1 is a generic schematic block diagram of a pattern generator according to the present invention.

Referring now to FIG. 1, there is shown a generic configuration of a pattern generator according to the present invention. Specific embodiments of this pattern generator will also be provided in the following description.

This pattern generator comprises a data input unit 100 from which input data are introduced, a data processing unit 200 which processes the input data introduced at the data input unit 100 to generate pattern data as well as to modify the generated pattern data in accordance with pattern evaluation values to be explained in detail below, a pattern output unit 300 for showing patterns specified by the pattern data generated by the data processing unit 200, a pattern feature extraction unit 400 for extracting feature data indicating parameterized physical features of the pattern data generated by the data processing unit 200, a subjective evaluation value input unit 500 for allowing a user to enter subjective evaluation values for the patterns shown by the pattern output unit 300, and a pattern evaluation unit 600 for deriving objective evaluation values in accordance with the feature data extracted by the pattern feature extraction unit 400 and for determining the pattern evaluation values to be provided to the data processing unit 200 in accordance with the subjective evaluation values and the objective evaluation values.

In this pattern generator, the input data to be processed into the patterns are initially introduced at the data input unit 100. Here, various types of data which convey information on the patterns, such as documents, sounds, and images can be used as the input data. The input data are subsequently processed at the data processing unit 200 in a prescribed manner once. Details of the manner of processing depends on the type of particular embodiment of this pattern generator. The resulting patterns are then displayed for the user by means of the pattern output unit 300.

At the same time, the feature data indicating parameterized physical features of the patterns are extracted by the pattern, feature extraction unit 400 from the pattern data. The manner of parametrizing the physical features of the pattern again depends on a type of a particular embodiment of this pattern generator. Then on the bases of this feature data, the objective evaluation values are derived by the pattern evaluation unit 600. The objective evaluation values are values of the characterizing quantities defined in terms of the physical parameters, and are to be determined automatically by the pattern generator itself with respect to prescribed reference values.

Now, upon inspecting the patterns shown by the pattern output unit 300, the user may have various subjective opinions regarding the characteristics of the patterns which may depend on personal preferences, temporal inclinations of the user, or the specific nature of the manner in which the patterns are intended to be used. Such subjective opinions of the user are entered at the subjective evaluation value input unit 500 in the form of the subjective evaluation values, which are then provided to the pattern evaluation unit 600. The subjective evaluation values are also to be specified as values of the characterizing quantities defined in terms of the physical parameters.

The pattern evaluation unit 600 determines the pattern evaluation values from the objective evaluation values and the subjective evaluation values, to be utilized in adjusting the manner of processing the input data by the data processing unit 200, and then, the data processing unit 200 re-processes the input data in this adjusted manner, so as to take the subjective opinions of the user expressed in the form of the subjective evaluation values into account. The specific manner in which the pattern evaluation values ere to be determined from the objective evaluation values and the subjective evaluation values again depends on the type of particular embodiment of this pattern generator. Likewise, the specific manner in which the pattern evaluation values are to be utilized in adjusting the manner of processing the input data again depends on the type of particular embodiment of this pattern generator.

As a result, the final output of the pattern generator reflects the particular requirements imposed by this particular user for this particular patterns.

In addition, in this pattern generator, the prescribed manner in which the input data are to be processed initially is automatically adjusted after the completion of one pattern generating operation, in accordance with the differences between the objective evaluation values derived by the pattern generators itself and the subjective evaluation values provided by the user, so that when the next pattern generating operation is to be performed the particular requirements imposed at the previous operation are automatically incorporated from the initial data processing stage.

Figure 2A:
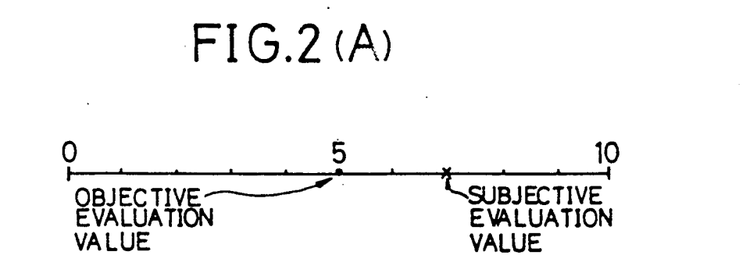
Figure 2B:
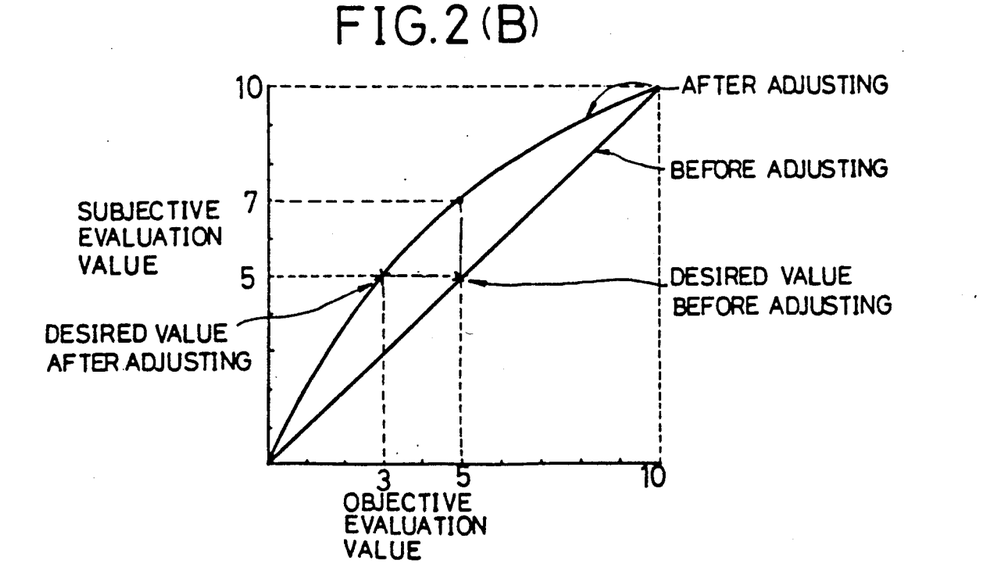

Namely, let one of the characterizing quantities be given in a scale of ten where five is a desired value for this characterizing quantity according to the prescribed reference value, and let the subjective evaluation value for this characterizing quantity be given by the user as seven while the objective evaluation value for this characterizing quantity was determined as five, as shown in FIG. 2(A). Then after the completion of the first pattern generating operation, the correspondence between the objective evaluation value and the subjective evaluation value is adjusted, as shown in FIG. 2(B), such that five for the objective evaluation value corresponds to seven for the subjective evaluation value. Consequently, the subsequent pattern generating operations will be carried out with the value of this characterizing quantity corresponding to five for the subjective evaluation value, which now corresponds to three for the objective evaluation value in FIG. 2(B), as a new desired value. This adjustment of the correspondence between the objective evaluation value and the subjective evaluation value can most simply be accomplished by means of an extrapolation using first order curves, second order curves, or spline functions. A statistical method such as a multi-dimensional scale construction may also be employed for this purpose.

Thus, when the user of the pattern generator is the same in successive operations and when the requirements imposed originally stem from the personal preferences of this user, the operations after the initial one can be simplified as the particular preferences of the user are automatically satisfied without any re-processing. On the other hand, when the user is different from one operation to the next, or when the original requirements stems from the temporal inclinations of the user or the specific nature of the manner in which the patterns are intended to be used, a new adjustment can always be made by going through the operation described above.

Figure 3:
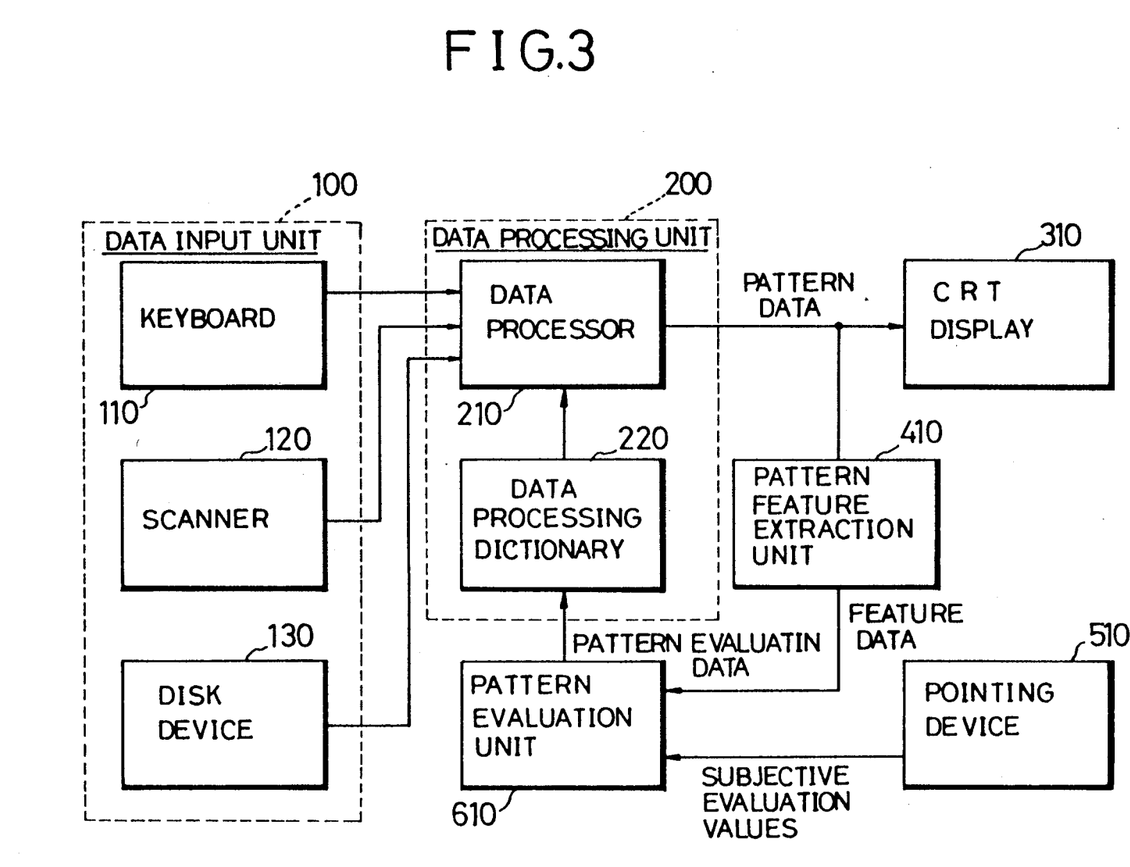
FIG. 3 is a schematic block diagram of one embodiment of a pattern generator according to the present invention which functions as a document editor.

Referring now to FIG. 3, one specific embodiment of the pattern generator according to the present invention which functions as a document editor will be explained.

In this pattern generator, the data input unit 100 comprises a keyboard 110 for manual entries of commands and the input data, a scanner 120 for reading image data, and a disk device 130 for storing prepared documents and graphics.

The data processing unit 200 processes the input data from the data input unit 100 such that the document specified by the input data is edited into a prescribed format. This data processing unit 200 comprises a data processor 210 for performing processing of the input data, and a data processing dictionary 220 for storing information necessary in carrying out data processing.

Figure 4:
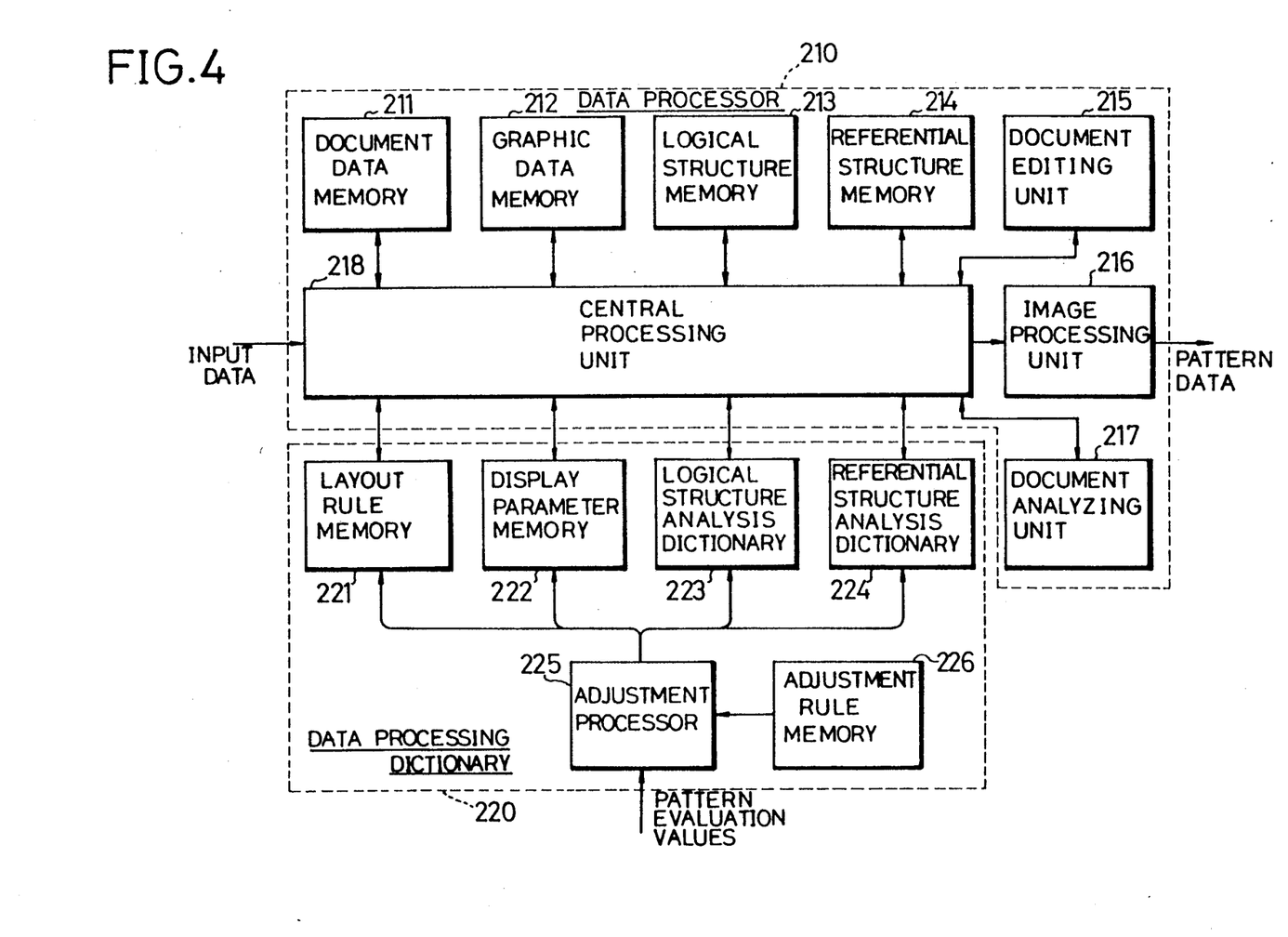
FIG. 4 is a detail block diagram of a data input unit and a data processing unit of the pattern generator shown in FIG. 3.

A more detailed configuration of this data processing unit 200 is shown in FIG. 4.

Namely, the data processor 210 is comprised of a document data memory 211 for storing data concerning documents, a graphic data memory 212 for storing data concerning graphics, a logical structure memory 213 for storing data concerning logical structure of the document, a referential structure memory 214 for storing data concerning referential structure of the document, a document editing unit 215 for editing the document according to a prescribed format and the logical and referential structures of the document stored in the logical structure memory 213 and the referential structure memory 214, an image processing unit 216 for performing various image processing operations on the edited document to produce the pattern data, a document analyzing unit 217 for analyzing the logical structure and the referential structure of the document, and a central processing unit 218 for interconnecting these parts of the data processor 210 and controlling the operations of all these parts.

The data processing dictionary 220 is comprised of a layout rule memory 221 for storing layout rules to be applied in editing the document into the format according to the logical structure and the referential structure of the document, a display parameter memory 222 for storing the display parameters such as number of words per line, line pitch, position of graphics, type of font, color, and embellishment, a logical structure analysis dictionary 223 for storing information necessary for the logical structure analysis of the document, a referential structure analysis dictionary 224 for storing information necessary for the referential structure analysis of the document, an adjustment processor 225 for adjusting those parts of the data processing dictionary 220 mentioned so far in accordance with the pattern evaluation values, and an adjustment rule memory 226 for storing rules for adjustments to be made by the adjustment processor 225.

Figure 5:
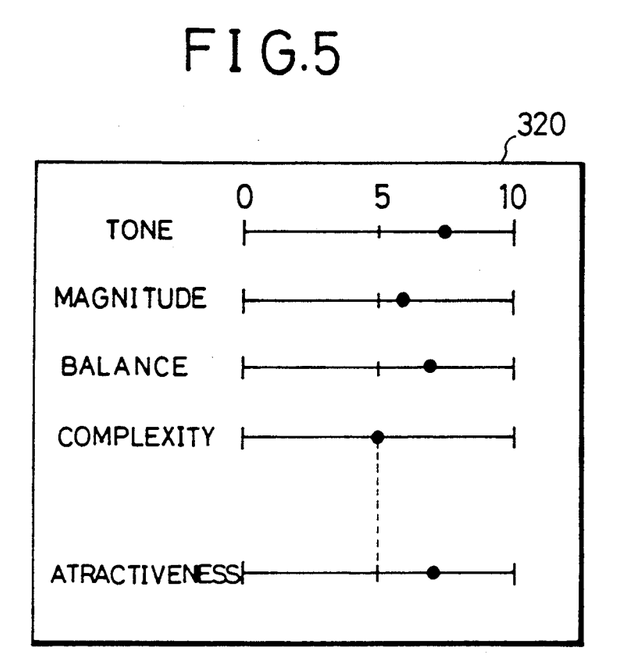
FIG. 5 is a diagram of a pattern feature extraction unit of the pattern generator shown in FIG. 3 for explaining its function.
Figure 6:
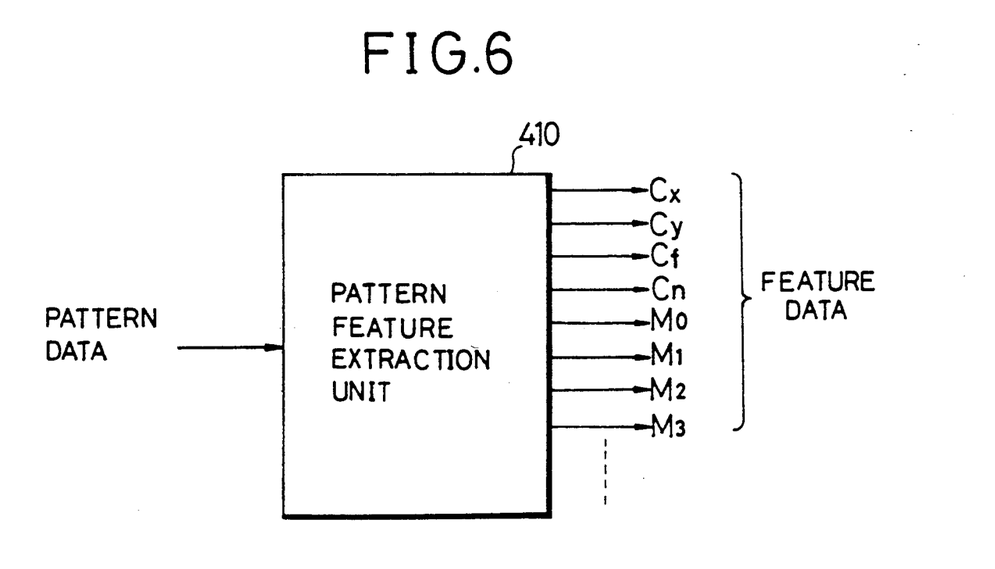
FIG. 6 is an exemplary view of a display showing characterizing quantities and the objective evaluation values to be presented to a user in the pattern generator shown in FIG. 3.

Returning now to FIG. 3, this pattern generator further comprises a CRT display 310 for displaying the pattern specified by the pattern data produced by the data processing unit 200. This CRT display 310 also displays the characterizing quantities along with the objective evaluation values determined for these characterizing quantities as shown in FIG. 5 where each of the characterizing quantities such as tone, magnitude, balance, complexity, and attractiveness is given in a scale of ten and where the black dots represent the objective evaluation values, a pattern feature extraction unit 410 for extracting the feature data from the pattern data produced by the data processing unit 200. The feature data here, for example, include a vertical complexity index Cx, a horizontal complexity index Cy, a total complexity index Cf, a connectivity index Cn, a mean moment M0, a first order moment M1, a second order moment M2, a third order moment M3, as shown in FIG. 6. The extraction of these feature data can be accomplished by the use of known methods such as one disclosed by K. Sakai in "An Optical Chinese Character Reader", The Third International Joint Conference on Pattern Recognition, 1976, pp. 122-126. Thus, for example, the complexity index Cf can be obtained from circumference of connected segments constituting the pattern and the area enclosed by them as:

$$Cf = (\text{Circumference})^2 / \text{Area}$$

Similar expressions for the other feature data can be found in the reference cited above. In terms of such physical parameters the characteristic quantities for which the objective evaluation values and the subjective evaluation values are to be given are defined. Thus, the characterizing quantities such as balance Eb and complexity Ec can be defined as functions of the vertical complexity index Cx, the horizontal complexity index Cy, the total complexity index Cf, the connectivity index Cn, the mean moment M0, the first order moment M1, the second order moment M2, the third order moment M3.

The pattern generator further comprises a pointing device 510 such as a mouse or a joy stick which allows the user to enter the subjective evaluation values. The entering of the subjective evaluation values can be carried out by specifying desired subjective evaluation values on the scales for the characterizing quantities displayed on the CRT display 310 explained above. This manner of entering of the subjective evaluation values may be replaced by oral ordering such as "Brighter" and "Less contrast" given by the user and detected by a speech recognition device. A combination of these two may also be effective.

The pattern generator further comprises a pattern evaluation unit 610 for determining the objective evaluation values in accordance with the feature data. This pattern evaluation unit 600 also determines the pattern evaluation values in accordance with the objective evaluation values and the subjective evaluation values, which are to be given to the data processing dictionary 220.

Figure 7:
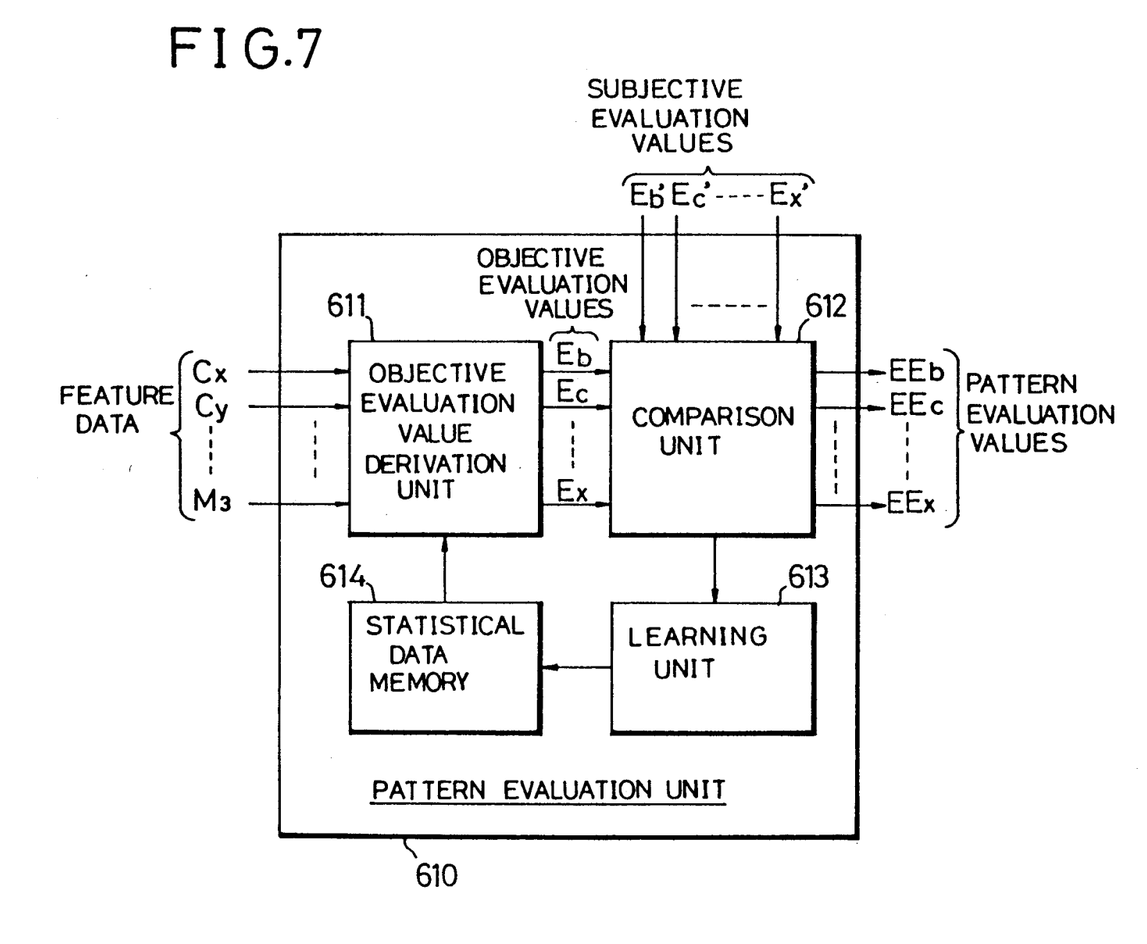
FIG. 7 is a detail block diagram of a pattern evaluation unit of the pattern generator shown in FIG. 3.

This pattern evaluation unit 610 is comprised, as shown in FIG. 7, of an objective evaluation value derivation unit 611, a comparison unit 612, a learning unit 613, and a statistical data memory 614.

The objective evaluation value derivation unit 611 derives the objective evaluation values, shown as Eb, Ec, and so on, in accordance with the feature data, shown as Cx, Cy, and so on, coming from the pattern feature extraction unit 410. The comparison unit 612 compares the derived objective evaluation values and the subjective evaluation values, shown as Eb', Ec', and so on, coming from the pointing device 510 and determines the pattern evaluation values, shown as EEb, EEc, and so on, by setting the pattern evaluation values equal to the objective evaluation values when the differences between the objective evaluation values and the subjective evaluation values are within a predetermined range around prescribed reference values and by setting the pattern evaluation values equal to the subjective evaluation values otherwise. The comparison unit 612 also produces a signal indicating the result of the comparison to the learning unit 613. The learning unit 613 determines the adjustment to be made on the statistical data stored in the statistical data memory 614 in order to incorporate the particular preferences of the user, when the signal indicating the result of the comparison from the comparison unit 612 repeatedly indicates that the differences between the objective evaluation values and the subjective evaluation values are outside the predetermined range for several consecutive times. The statistical data stored in the statistical data memory 614 are originally provided as statistical averages of values for the characterizing quantities obtained by surveying a large number of potential users, and will be adjusted as necessary according to the directions given by the learning unit 613. These statistical data are provided to the objective evaluation value derivation unit 611 and serve as the reference values with respect to which the objective evaluation values are determined. These reference values may also be prescribed automatically by the pattern generator according to the intended use of the pattern to be generated. For example, the characterizing quantities such as attractiveness can be set greater for the patterns to be used in lectures at professional conferences, whereas simplicity can be set greater for the pattern to be used in talks to be delivered for layman. The reference values may also be prescribed by the user before the beginning of the operation, which may improve the efficiency of the operation under certain circumstances.

Figure 8A:
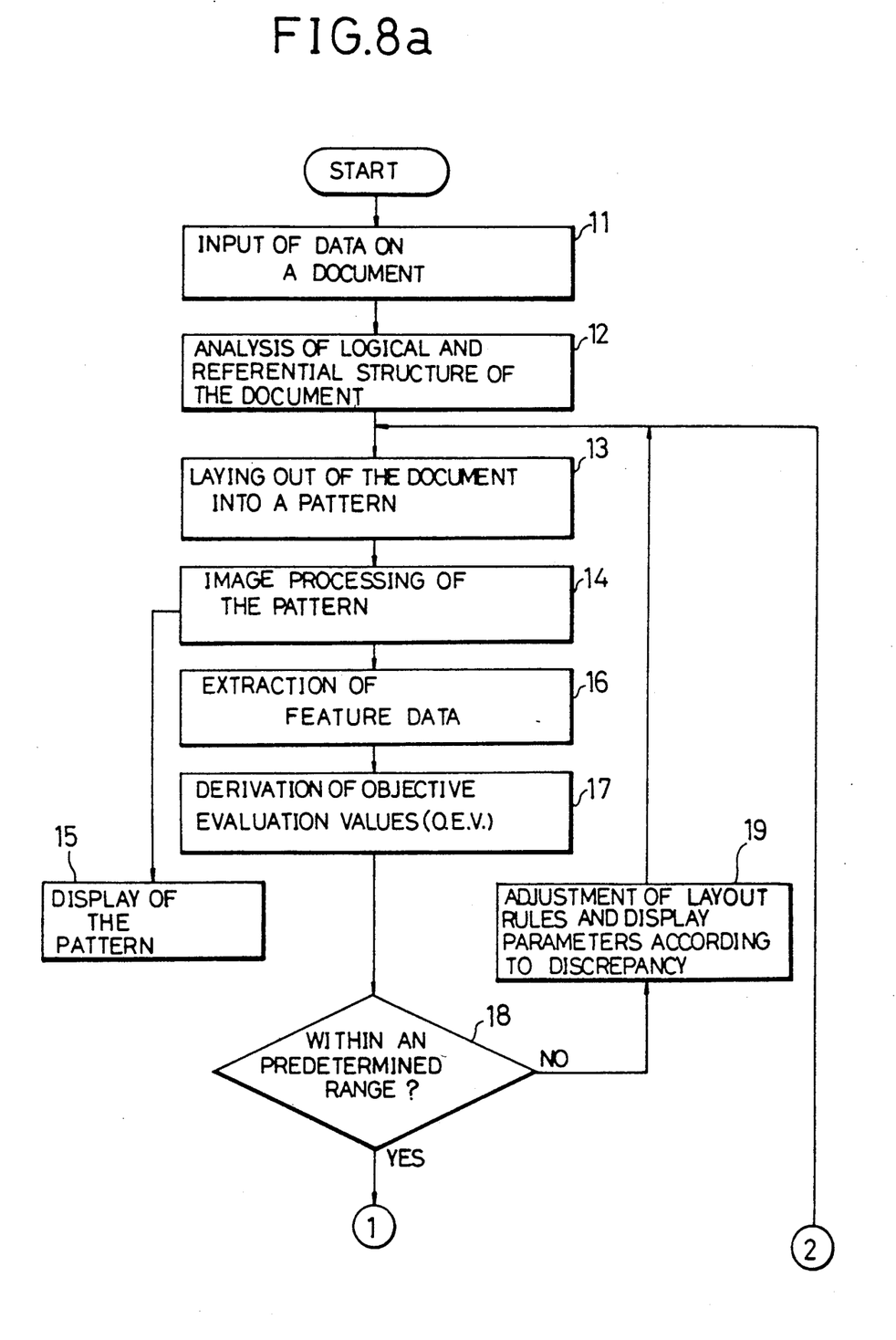
FIGS. 8a and 8b are flow charts for the operation of the pattern generator shown in FIG. 3.
Figure 8B:
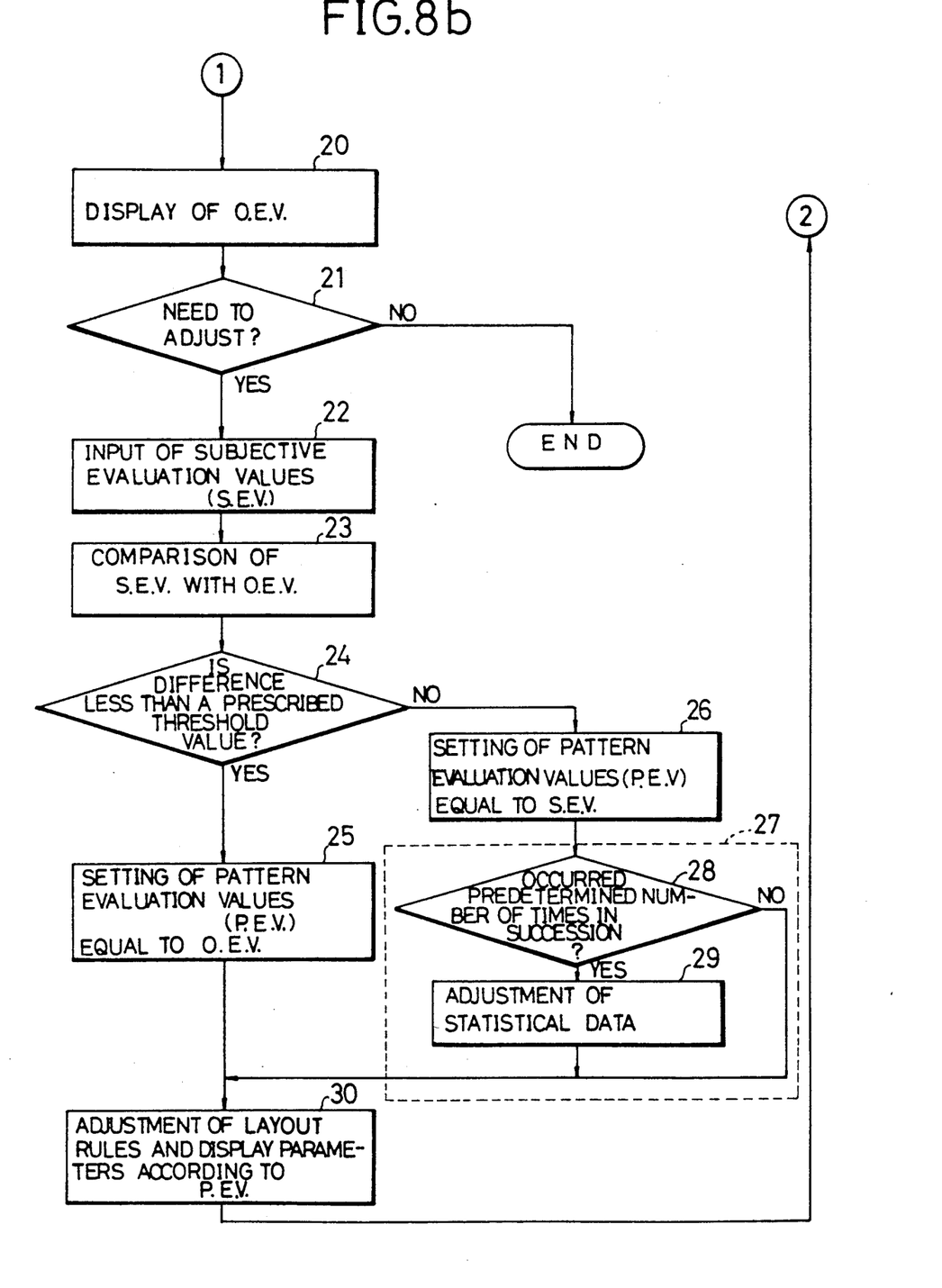

Referring now to FIG. 8, the operation of this embodiment of the pattern generator will be explained.

At the step 11, the input data are entered from the data input unit 100 and document parts of the input data are stored in the document data memory 211 while graphic parts of the input data are stored in the graphic data memory 212. Then at step 12, the logical and referential structures of the document are analyzed by the document analyzing unit 217 supported by the logical structure analysis dictionary 223 and the referential structure analysis dictionary 224, and the logical structure of the document obtained is stored in the logical structure memory 213 whereas the referential structure of the document obtained is stored in the referential structure memory 214. Then at the step 13, the document data and the graphic data are laid out into a pattern by the document editing unit 215 supported by the layout rule memory 221 and the display parameter memory 222, in accordance with the logical and referential structures of the document. Here, font type and font size are determined by the layout rules. Then at the step 14, various image processing such as smoothing, thinning, edge accentuating, and contrasting are performed on the edited document, and the resulting pattern is displayed on the CRT display 310 at the step 15.

On the other hand, at the step 16, the feature data of the displayed pattern are extracted by the pattern feature extraction unit 410 and are provided to the objective evaluation value derivation unit 611. Then the objective evaluation values (abbreviated as O.E.V. in FIG. 8) are derived by the objective evaluation value derivation unit 611 at the step 17. Next, at the step 18 whether the objective evaluation values obtained are within a predetermined range around the prescribed reference values is determined.

When the objective evaluation values obtained are not within the predetermined range, the layout rules stored in the layout rule memory 221 and the display parameters stored in the display parameter memory 222 are adjusted in accordance with the discrepancy found between the derived objective evaluation values and the predetermined range at the step 19, and the steps from the step 13 on are repeated with the adjusted layout rules and the display parameters.

Otherwise, the derived objective evaluation values are displayed on the CRT display 310 at the step 20, and whether any adjustment is necessary is decided on the basis of a command from the user at the step 21. When no adjustment is required the process terminates. Otherwise, at the step 22 the user is asked to enter the subjective evaluation values (abbreviated as S.E.V. in FIG. 8) for the characterizing quantities displayed. Then, at the step 23 the objective evaluation values and the subjective evaluation values are compared with each other by the comparison unit 612, and difference between them is compared with a prescribed threshold value at the step 24. When the difference between them is less than the prescribed threshold value, the pattern evaluation value (abbreviated as P.E.V. in FIG. 8) is set equal to the objective evaluation value and the process proceeds to the step 30, whereas otherwise, the pattern evaluation value is set equal to the subjective evaluation value at the step 26.

Then, at the step 27 learning of the particularity of the user is carried out by the learning unit 613. More specifically, at the step 28 whether a difference larger than the prescribed threshold value occurred a predetermined number of times in succession is determined. That is, learning is performed for long term user adaptation, but not for each item of input data. When this is the case, the differences are judged s the particularity of this user and the statistical data stored in the statistical data memory 614 are adjusted to incorporate such particularity and the process proceeds to the step 30, whereas otherwise the process proceeds directly from the step 28 to the step 30, leaving the statistical data memory unadjusted. At the step 30, the pattern evaluation values determined by the pattern evaluation unit 610 are provided to the adjustment processor 225 supported by the adjustment rule dictionary 226, and the layout rules in the layout rule memory 221 as well as the display parameters in the display parameter memory 222 are adjusted in accordance with the pattern evaluation values. For example, according to the adjustment rule concerning the complexity Ec given by:

If (Ec > a)

Then character pitch → wider graphic size → larger the character pitch and the graphic size in the layout rules and the display parameters are adjusted. After such adjustments, the steps from the step 13 on are repeated with a adjusted layout rules and the display parameters.

The operation just described is repeated until the pattern that satisfies the specific requirement imposed by the user is obtained.

Figure 9:
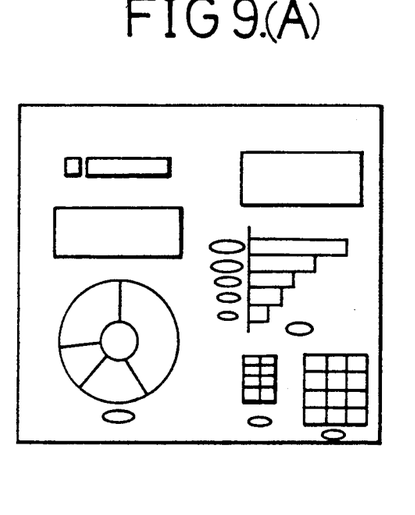

FIG. 9(A) shows an example of the pattern displayed at step 15 initially, which was evaluated by user as unsatisfactory with regards to the balance and the attractiveness. Accordingly, the adjustments are carried out to rectify these deficiencies and the pattern shown in FIG. 9(B) is obtained which achieves the improved balance and attractiveness.

As explained, according to this embodiment of the pattern generator, the generated pattern is adjusted in accordance with the subjective evaluation values given by the user, so that the final output pattern can reflect the personal preferences and particular inclinations of the user. Moreover, the user is required only to specify the subjective evaluation values for the automatically generated pattern, so that it is unnecessary for the user to manipulate numerous complicated commands as required by the highly functional editors, and so consequently the operation by the user is greatly simplified. Furthermore, by means of the learning unit 613, the personal preferences and particular inclinations of the user utilized in one pattern generating operation are incorporated in the statistical data so that in the subsequent pattern generating operations such personal preferences and particular inclinations are automatically reflected without being specified by the user again.

It is to be noted that the use of the statistical data as a basis of the derivation of the objective evaluation values in the above embodiment is not essential, and the statistical data memory 614 can be replaced, for example, by an AI application system such as a Rule-base (expert system) so that the objective evaluation values can be derived according to the prescribed rules.

It is also to be noted that the condition regarding whether the difference larger than the prescribed threshold value occurred a predetermined number of times in succession is utilized only to reduce the possibility of incorrect learning, and can be modified in various different manners without affecting the novel and advantageous features of the present invention. In particular, the learning can be performed separately from the processing operation afterwards which may be desirable when dealing with a large amount of data.

Figure 10:
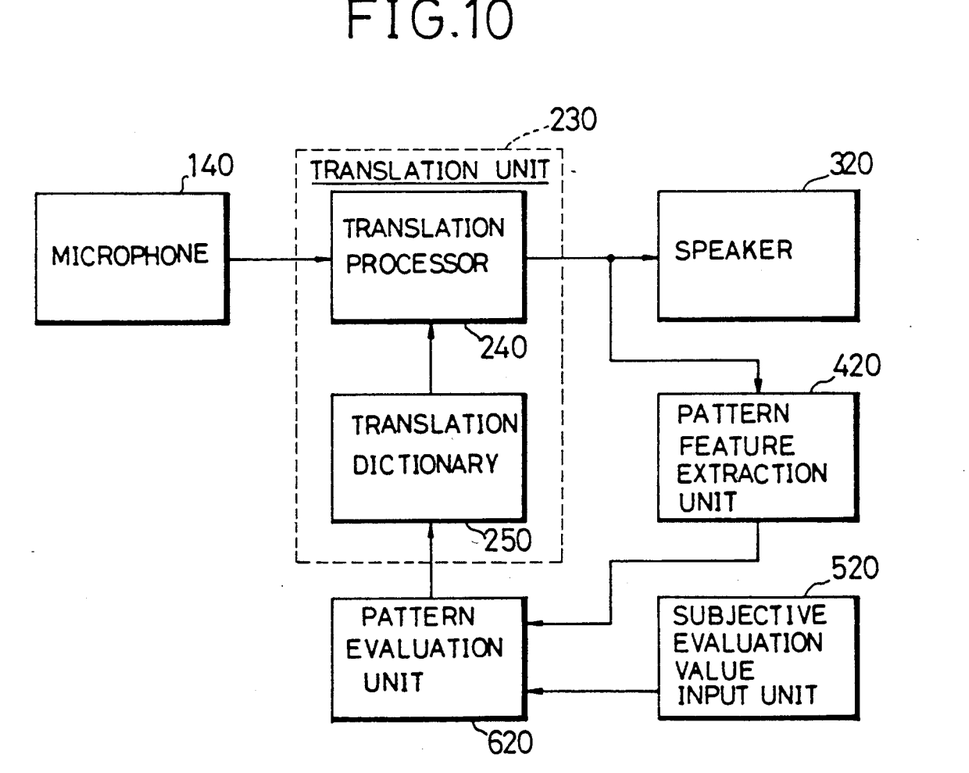
FIG. 10 is a schematic block diagram of another embodiment of a pattern generator according to the present invention which functions as an automatic translator.

FIG. 10 shows another specific embodiment of the pattern generator according to the present invention which function as an automatic translator of oral input data.

This pattern generator comprises a microphone 140 as an data input unit, a translation unit 230 including a translation processor 240 and a translation dictionary 250 as a data processing unit, a speaker 320 as a pattern output unit, a pattern feature extraction unit 420, a subjective evaluation value input unit 520, and a pattern evaluation unit 620.

In this pattern generator, the characterizing quantities such as modulation, tone, speed, stiffness, style, softness of the generated sound pattern are evaluated, and the manner of selecting words utilized by the translation dictionary 250 and the parameters specifying the various quality of the sound are adjusted in accordance with the preferences of the user.

Figure 11:
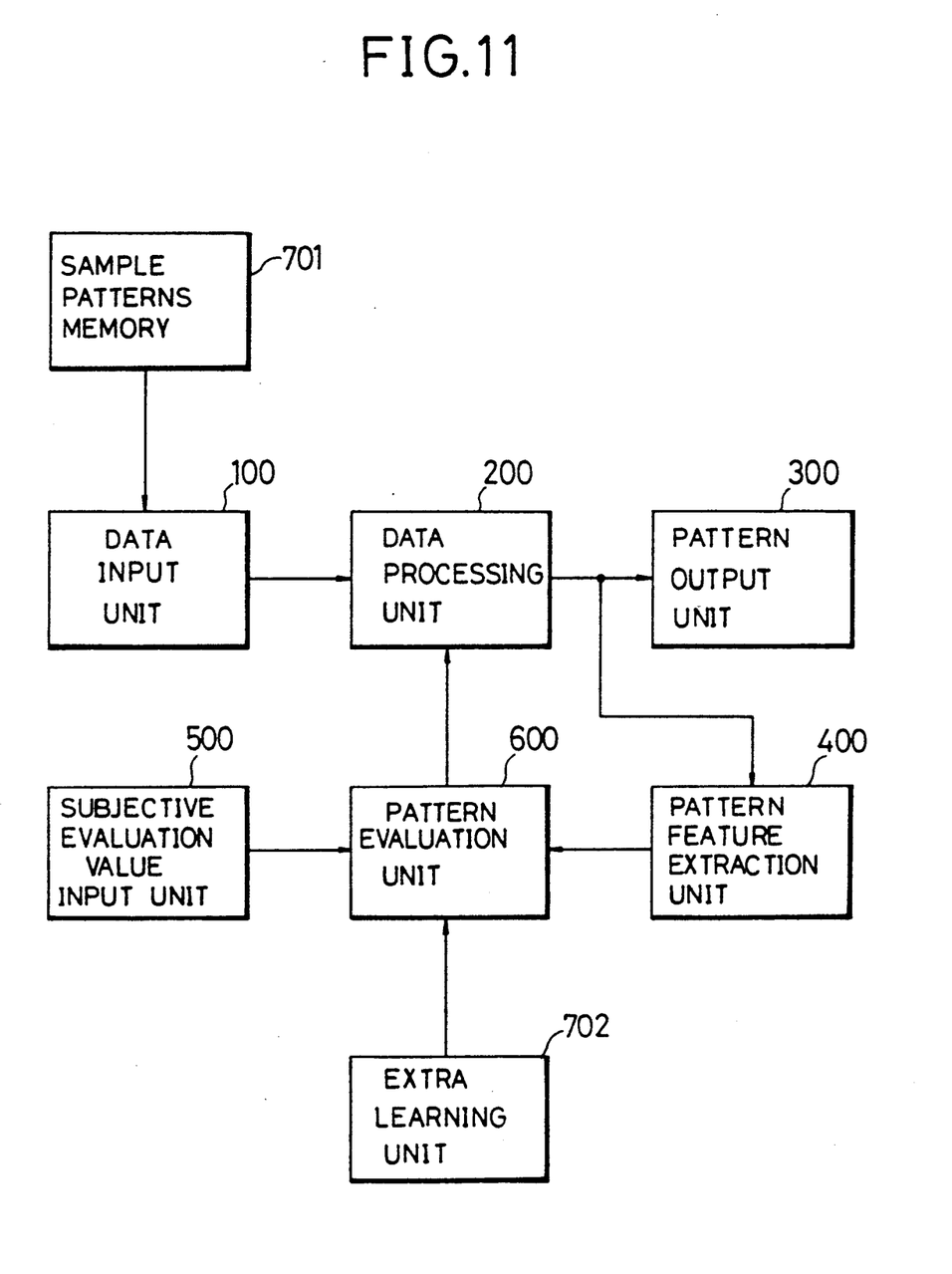
FIG. 11 is a schematic block diagram of one modification of the pattern generator shown in FIG. 1.

FIG. 11 shows one effective modification of the pattern generator shown in FIG. 3. In FIG. 11, the pattern generator includes a sample patterns memory 701 and an extra learning unit 702 in addition to all the parts of the pattern generator shown in FIG. 3. In this pattern generator the sample patterns memory 701 stores sample patterns prepared in advance for specific types of users such as doctors, administrators, technicians, and teachers and specific types of usage such as examinations, lectures, recreations, and meetings, and the extra learning unit 702 learns the appropriate manners of generating patterns and parameters for such specific types of users and specific types of usage in advance, so that the pattern generator can operate in optimal efficiency according to the structure of the pattern generator itself known to the manufacturer.

Besides these, many modifications and variations of these embodiments may be made without departing from the novel and advantageous features of the present invention. Accordingly, all such modifications and variations are intended to be included within the scope of the appended claims.

What is claimed is:

1. An apparatus for generating patterns, comprising:
    data input means for enabling introduction of input data to said apparatus;
    data processing means for processing said input data to generate pattern data;
    pattern output means for producing a pattern specified by said pattern data, said pattern defining a representation of said input data;
    pattern feature extraction means for extracting feature data indicating physical features of said pattern from said pattern data;
    means for allowing a user to enter subjective evaluation values indicating evaluation by said user for characterizing quantities defined in terms of said physical features;
    means for deriving objective evaluation values indicating evaluation by said apparatus for said characterizing quantities with respect to prescribed reference values;
    pattern evaluation means for determining pattern evaluation values in accordance with said subjective evaluation values and said objective evaluation values;
    means for adjusting a manner of processing by said data processing means in accordance with said pattern evaluation values; and
    feedback loop means for causing said data processing means to re-process said input data in said manner adjusted by said adjusting means.

2. The apparatus of claim 1, further comprising:
    preliminary checking means for modifying said manner of processing by said data processing means when one of said objective evaluation values is not within a prescribed range around a corresponding prescribed reference value; and
    preliminary feedback loop means for causing said data processing means to re-process said input data in said manner as modified by said preliminary checking means.

3. The apparatus of claim 2, wherein said preliminary checking means modifies said manner of processing in accordance with a discrepancy between said objective evaluation values and said prescribed range around said corresponding prescribed reference value.

4. The apparatus of claim 1, further comprising means for determining said prescribed reference values according to statistical data indicating numerous subjective evaluation values collected from a multiplicity of potential users.

5. The apparatus of claim 1, further comprising:
    means for storing exemplary patterns; and
    means for determining said prescribed reference values according to results of processing said exemplary patterns.

6. The apparatus of claim 1, wherein said pattern evaluation means determines said pattern evaluation values in accordance with a difference between said objective evaluation values and said subjective evaluation values.

7. The apparatus of claim 6, wherein said pattern evaluation means determines said pattern evaluation values by setting said pattern evaluation values equal to said objective evaluation values when all differences between said objective evaluation values and said subjective evaluation values are less than a prescribed threshold value, and by setting said pattern evaluation values equal to said subjective evaluation values otherwise.

8. The apparatus of claim 1, wherein said adjusting means adjusts said manner of processing by adjusting said prescribed reference values.

9. The apparatus of claim 8, wherein said adjusting means adjusts said prescribed reference values by modifying correspondence between said objective evaluation values and said subjective evaluation values.

10. The apparatus of claim 1, wherein said adjusting means adjusts said manner of processing only when one of differences between said objective evaluation values and said subjective evaluation values is not less than a prescribed threshold value for a predetermined number of times consecutively.

11. A method of generating patterns, comprising the steps of:
- (a) introducing input data;
- (b) processing said input data to generate pattern data;
- (c) producing a pattern specified by said pattern data, said pattern defining a representation of said input data;
- (d) extracting feature data indicating physical features of said pattern from said pattern data;
- (e) allowing a user to enter subjective evaluation values indicating an evaluation by said user for characterizing quantities defined in terms of said physical features;
- (f) deriving objective evaluation values indicating evaluation by said apparatus for said characterizing quantities with respect to prescribed reference values;
- (g) determining pattern evaluation values in accordance with said subjective evaluation values and said objective evaluation values;
- (h) adjusting a manner of processing at step (b) in accordance with said pattern evaluation values; and
- (i) re-processing said input data in said manner adjusted at step (h).

12. The method of claim 11, further comprising the steps of:
- (j) modifying said manner of processing at step (b) when one of said objective evaluation values derived is not within a prescribed range around a corresponding prescribed reference value; and
- (k) re-processing said input data in said manner as modified at step (j).

13. The method of claim 12, wherein at step (j) said manner of processing modified in accordance with a discrepancy between said objective evaluation values derived and said prescribed range around said corresponding prescribed reference value.

14. The method of claim 11, further comprising the step of determining prescribed reference values according to statistical data indicating numerous subjective evaluation values collected from a multiplicity of potential users.

15. The method of claim 11, further comprising the steps of:
- (l) storing exemplary patterns; and
- (m) determining prescribed reference values according to results of processing said exemplary patterns.

16. The method of claim 11, wherein at step (g) said pattern evaluation values are determined in accordance with differences between said objective evaluation values and said subjective evaluation values.

17. The method of claim 16, wherein at step (g) said pattern evaluation value are determined by setting said pattern evaluation values equal to said objective evaluation values when all differences between said objective evaluation values and said subjective evaluation values are less than a prescribed threshold value, and by setting said pattern evaluation values equip to said subjective evaluation values otherwise.

18. The method of claim 11, wherein at step (h) said manner of processing adjusted by adjusting said prescribed reference values.

19. The method of claim 18, wherein said prescribed reference values are adjusted by modifying correspondence between said objective evaluation values and said subjective evaluation values.

20. The method of claim 11, wherein at step (g) said manner of processing is adjusted only when one of differences between said objective evaluation values and said subjective evaluation values is not less than a prescribed threshold value for a predetermined umber of times consecutively.

* * * * *